Aug. 4, 1959  G. E. BENNETT ET AL  2,898,023
METHOD AND MEANS FOR INSPECTING FULL-FASHIONED HOSIERY
Filed Jan. 3, 1957

INVENTORS
GARLAND E. BENNETT,
ROBERT M. MATHEWS &
RAY BAILEY
BY Parrott & Richards
ATTORNEYS

United States Patent Office 2,898,023
Patented Aug. 4, 1959

2,898,023

METHOD AND MEANS FOR INSPECTING FULL-FASHIONED HOSIERY

Garland E. Bennett and Robert M. Matthews, Charlotte, N.C., and Ray Bailey, Gainesville, Ga., assignors, by mesne assignments, to Alamance Industries, Inc., Concord, N.C., a corporation of North Carolina Application January 3, 1957, Serial No. 632,317

7 Claims. (Cl. 223—75)

This invention relates generally to the inspection of full-fashioned hosiery, and more particularly to an improved method and means for inspecting such hosiery in the greige after seaming and by which both the seaming and inspection operations are substantially facilitated.

Briefly described, the method and means of the present invention are characterized by the seaming of successive full-fashioned hosiery units without severing the seaming stitch chain and thereby forming a series of such units connected by intervening stitch chain portions running from the welt of the first unit seamed to the toe of the next unit and so on; and by delivering this series of seamed hose units to an inspection station at which the last unit seamed is drawn welt-first over an inspection form, as a leading unit, with the following unit supported in spaced relation so that the intervening stitch chain portion is extended from the toe of the leading unit being inspected to allow severing of this stitch chain portion readily during the inspection operation and thereby separate the inspected leading unit from the series, while leaving the following unit supported conveniently to be subsequently grasped and drawn on the inspection form so as in turn to repeat the inspection operation on each unit of the series. This manner of inspecting full-fashioned hosiery according to the present invention also allows the arrangement of severing means adjacent the inspection form for actuation from the manipulating motion thereof to sever the above noted intervening stitch portions automatically during each inspection operation.

These and other features of the present invention are described in further detail below in connection with the accompanying drawings, in which.

Figure 1:
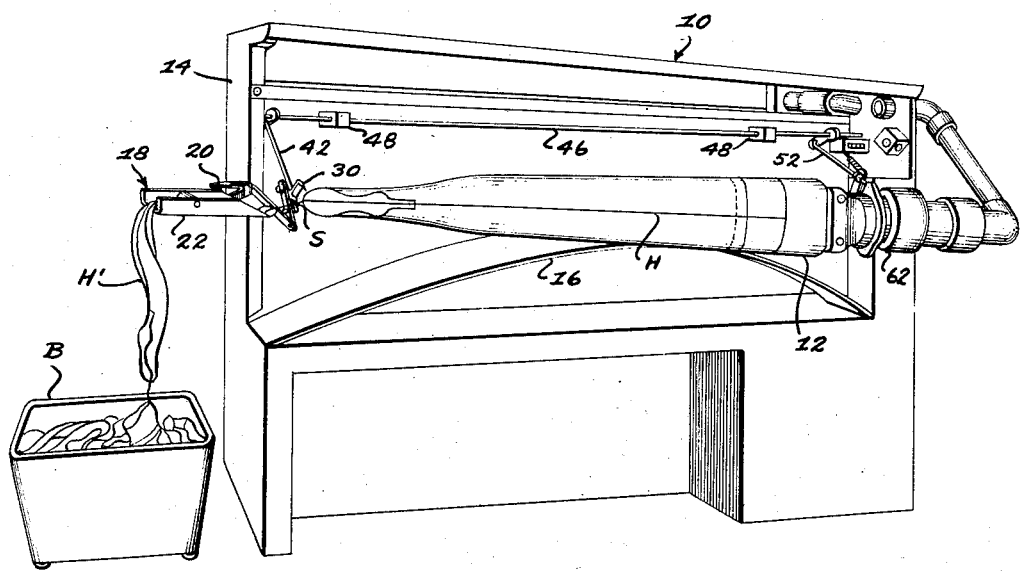
Fig. 1 is a perspective view of an inspection station arranged in accordance with the present invention.

Referring now in detail to the drawings, the inspection station illustrated in Fig. 1 comprises an inspection device, as indicated generally by the reference numeral 10, at the front of which an inspection form 12 is mounted for rotating inspection manipulation about its longitudinal axis in the usual manner. The inspection form 12 is of conventional shape, except that it is arranged with an opening (not shown) at its tip end leading to a channel formed axially therein through which an inspected hose unit can be removed toe-first from the form 12 by suction and thereby reversed during its removal. The inspection device 10 is further arranged with a hood section at 14 into which the inspected and reversed hose unit is carried by the suction means for deposit on a stacking table, such as is indicated at 16, so as to be conveniently accessible for transfer therefrom to a dye bag, or other subsequent processing means, after a desired number of inspected hose units have been accumulated thereon. The above described arrangement of the inspecting device 10 follows the form of such device currently being manufactured and sold by Specialty Manufacturing & Sales Company of Acworth, Georgia, and is accordingly not a part of the present invention, but simply represents a particular form of inspection device with which the present invention may be carried out to advantage, and which might be replaced by any other satisfactory form of inspection device desired.

Figure 2:
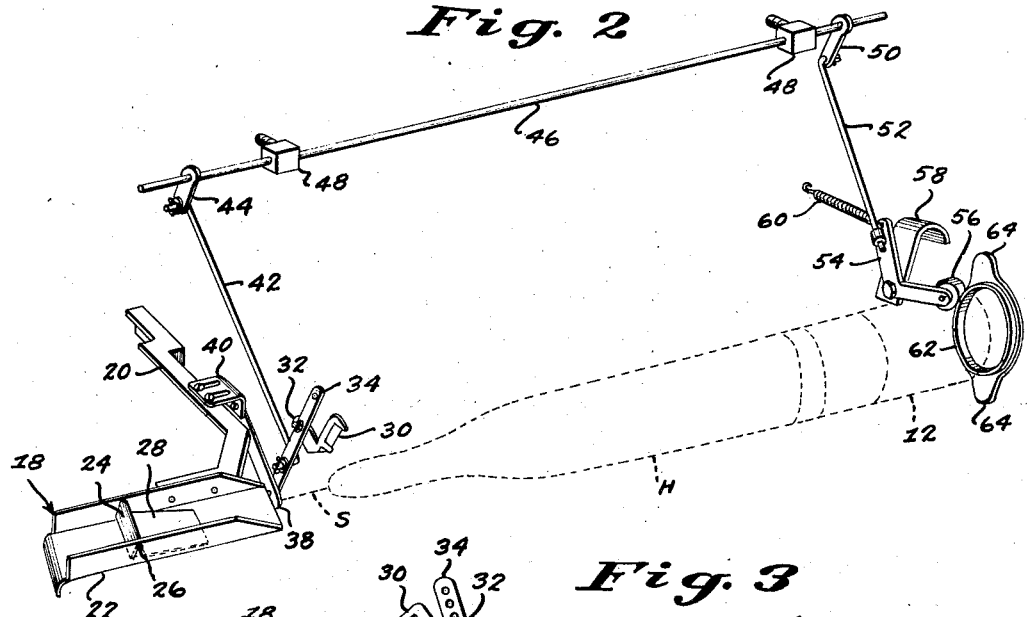
Fig. 2 is a further perspective view showing only the severing means arrangement provided at the inspection station for actuation from the manipulating motion of the inspection form according to the present invention.
Figure 3:
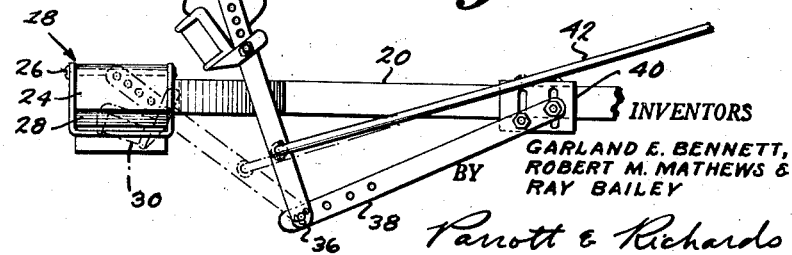
Fig. 3 is a fragmentary detail in end elevation of the cutting element included in the severing means shown in Fig. 2.

According to the present invention, a hosiery supporting member, as indicated generally by the reference numeral 18, is arranged on the inspection device 10 adjacent the tip end of the inspection form 12 (see Figs. 1 and 2). This hosiery supporting member 18 is mounted on the hood section 14 of the inspection device 10 by a mounting bracket 20 and comprises a channel shaped body component 22 aligned longitudinally with the inspection form 12 and spaced longitudinally from the tip end thereof, with a gate structure 24 hinged therein, as indicated at 26, so as to hang with an angular, forwardly extending, portion 28 balanced to weight the forward end thereof downwardly about the hinge axis at 26 and thereby form a variable orifice within the body component 22 that is biased to impose a dragging resistance on a hose unit drawn through the body component 22 below the gate structure 24.

At an inspection station arranged in the above described manner according to the present invention, the full-fashioned hosiery to be inspected is delivered in a basket B after having been seamed in series, as previously noted, so that a leading hose unit H drawn over the inspection form 12 as shown in Fig. 1, will have an unsevered intervening stitch chain portion S extending from the toe thereof to the welt of a following hose unit H'. With the full-fashioned hosiery connected in series in this manner for inspection, the inspection operation is carried out by first drawing the leading hose unit H through the body component 22 of the supporting member 14, beneath the gate structure 24 therein, before the hose is drawn over the inspection form 12. As this is done, the downwardly balanced arrangement of the gate structure 24 in the body component 22 imposes a dragging resistance on the hose units H and H' as they are drawn therethrough, and the spacing of the body component 22 from the adjacent tip of the inspection form 12 is arranged in relation to the length of the intervening stitch chain portions S, so that the result of drawing the leading hose unit H over the inspection form 12 is to cause the welt portion of the following hose unit H' to be drawn beneath the gate structure 24 in the body component 22 of the hosiery supporting member 18, with the intervening stitch chain portion S extended from the adjacent end of the inspection form 12 where it may be severed readily in the course of the inspection operation, so as to separate the leading hose unit H from the series being withdrawn from the bracket B for inspection. Upon such separation the hose unit H may then be removed from the inspection form 12 in the manner noted above after its inspection has been completed, and the following hose unit H' will then be left with the above noted portion of its welt drawn partially beneath the gate structure 24 in the supporting member body component 22 to be subsequently grasped and drawn completely therethrough to repeat the inspection operation in like manner on each hose unit of the series contained in the basket B.

In order to provide for severing the intervening stitch chains S conveniently during the inspection operation, the inspection device 10 is further equipped according to the present invention with severing means comprising a knife element 30 mounted for transverse pivoting movement across the spacing between the hosiery supporting member 18 and the adjacent tip end of the inspection form 12 to cut each intervening stitch chain portion S at a point of contact therewith. The knife element 30 is adjustably mounted for this purpose at 32 on a pivot arm 34 that is pivotally carried at 36 on a positioning arm 38 adjustably fixed at a supporting bracket 40 on the previously mentioned mounting bracket 20 provided for the hosiery supporting member 18.

The pivot arm 34 further has a connecting rod 42 running pivotally therefrom to a rock arm 44 on a cross shaft 46 supported within the hood section 14 of the inspection device 10 by a pair of bearing blocks 48. This cross shaft 46 extends to carry a second rock arm 50 from which a second connecting rod 52 extends pivotally to one leg of a bell crank 54 having a follower roll 56 mounted on its other leg. The bell crank 54 is supported within the hood section of the inspection device 12 on a mounting bracket 58 adjacent the shank end of the inspection form 12, and is biased by a spring 60 so as normally to maintain the knife element 30 pivoted to a retracted position above the position of a stitch portion S extended from a hose unit H on the inspection form 12. However, the follower roll 56 is carried by the bell crank 54 in relation to a cam plate 62 mounted at the shank of the inspection form 12 and having oppositely disposed cam rises 64 arranged so that when the inspection form 12 is turned over about its longitudinal axis during each inspection operation to view the other side of a hose unit H disposed thereon, the follower roll 56 is displaced downwardly by one of the cam rises 64 to cause pivoting of the bell crank 54 against the bias thereon from spring 60 and thereby actuate the necessary pivoting of knife element 30 to effect cutting of the intervening stitch chain S automatically from the manipulating motion of the inspection form 12.

By carrying out the inspection operation in this manner, the preceding seaming operation is substantially speeded up by eliminating any necessity for severing the seaming stitch chain after the seaming of each hose unit is completed, as is normally done according to current practice. All that is necessary according to the present invention is to direct the hose units as they are seamed continuously into a basket, such as B, for subsequent delivery to the inspection station, being careful to maintain a reasonably uniform length of intervening stitch chain portion S between the successive hose units of the series, and using some convenient means, such as a clip (not shown) at the top of the basket B, for identifying the welt of the last hose unit seamed, so as to indicate the hose unit H that will become the leading unit in starting the inspection operation. As to the length of intervening stitch chain portion S between the units of the series as they are arranged for inspection, a length of approximately 1½" is satisfactory to allow adequate access thereto for severing, while maintaining the residual stitch chain lengths on each hose unit after severing small enough so that they are not objectionable.

In the inspection operation, in addition to the fact that the severing of the intervening stitch chain portions S can be actuated automatically from the manipulating motion of the inspection form 12, a further important advantage obtained according to the present invention is the initial disposition of each hose unit by the supporting member 18 in a uniformly level and aligned relation with the inspection form 12 as the hose is drawn therethrough, so that the step of disposing the hose units on the inspection form 12 is carried out under comparable conditions for all units and a much more uniform inspection result is obtained than where succeeding hose units are drawn onto the inspection form from continuously varying positions, as is usually the case.

The present invention has been described in detail above for purposes of illustration only and is not intended to be limited by this description or otherwise except as defined in the appended claims.

We claim:

1. The method of handling full-fashion hosiery which comprises seaming successive units of said hosiery without severing the seaming stitch chain and thereby forming a series of hose units connected by intervening stitch chain portions running from the toe of a leading unit to the welt of a following unit, drawing the leading unit of said series longitudinally through frictionally confining means imposing a drag thereon and then over an inspection form aligned longitudinally with said frictionally confining means and spaced longitudinally therefrom, whereby the disposition of a leading unit of said series of said inspection form causes the following unit to be drawn to a supporting extent through said frictionally confining means with the intervening stitch chain portion extended from the adjacent end of said inspection form, and severing said extended stitch chain portion in the course of an inspection operation at said form to separate said leading unit from the series and leave the following unit supported at said frictionally confining means to be subsequently grasped and drawn therethrough to repeat the inspection operation thereon.

2. Means for inspecting full-fashioned hosiery that has been seamed without severing the seaming stitch chain between successive units of said hosiery, so as to form a series of hose units connected by intervening stitch portions running from the toe of a leading unit to the welt of a following unit, said means comprising a hosiery supporting and frictionally confining member arranged to have the leading hose unit of said series drawn longitudinally drawn therethrough under a dragging resistance, an inspection form aligned longitudinally with said supporting member and having the toe end thereof spaced longitudinally from said member, whereby the disposition of a leading hose unit of said series on said inspection form, after being drawn through said supporting member, results in drawing a portion of the following hose unit of said series through said supporting member with the intervening stitch chain portion extended from the toe of the leading hose unit on said inspection form, and means for severing said extended stitch chain portion during the inspection operation to separate said leading hose unit from said series so that it may be removed separately from said form after inspection and to leave the following hose unit supported by said supporting member so that it may be subsequently grasped and drawn completely therethrough to repeat the inspection operation thereon.

3. Means for inspecting full-fashioned hosiery that has been seamed without severing the seaming stitch chain between successive units of said hosiery so as to form a series of hose units connected by intervening stitch portions running from the toe of a leading unit to the welt of a following unit, said means comprising a hosiery supporting member incorporating an orifice through which the leading hose unit of said series may be drawn longitudinally under a dragging resistance, an inspection form arranged for rotating inspection manipulation about a longitudinal axis aligned with said supporting member and having the toe end thereof spaced longitudinally from said member, means for severing said intervening stitch chain portions disposed for operation at the spacing between said supporting member and inspection form, and means connecting said severing means for actuation from the rotating motion of said inspection form during an inspection operation.

4. Means for inspecting full-fashioned hosiery as defined in claim 3 and further characterized in that said severing means comprises a knife element mounted for pivoting to cut said intervening stitch chain portions at a point of contact therewith.

5. Means for inspecting full-fashioned hosiery as defined in claim 4 and further characterized in that said means connecting said severing means for actuation from the rotating motion of said inspection form comprises a linkage running from said knife element to a cam follower, and a cam mounted on said inspection form to rotate therewith for displacing said follower to cause pivoting of said knife element whenever said inspection form is turned over.

6. In a greige inspection machine for full-fashioned hosiery having a rotatable inspection form and a stitch severing device associated therewith for severing the stitches between adjacent stockings, an actuating mechanism for automatically moving the severing device into and out of operative position simultaneously with the rotation of the inspection form, said actuating mechanism comprising cam means rotatable with said inspection form, a lever engaged by the cam means, and linkage means operatively connected to the lever and to the severing device whereby movement of the lever through rotation of the inspection form results in simultaneous movement of the severing device into and out of operative position.

7. An apparatus for inspecting successive stockings stitched together toe to welt in a chain and for automatically severing the stitching between successive stockings, said apparatus comprising a first rotatable shaft, an inspection form fixed to said shaft and onto which successive stockings in said chain of stockings are drawn for inspection, stitch severing means for severing the stitching between adjacent stockings, means for supporting and frictionally confining the stocking next adjacent the stocking on the inspection form to place the stitching connecting said stockings in the path of the severing means, and mechanically operable means for actuating the severing means simultaneously with the rotation of the inspection form.

References Cited in the file of this patent
UNITED STATES PATENTS

| | | |
|---|---|---|
| 2,704,988 | Rosenblum | Mar. 29, 1955 |
| 2,722,348 | Ammon | Nov. 1, 1955 |
| 2,787,231 | Shoaf | Apr. 2, 1957 |

OTHER REFERENCES

Textile World Publication, December 1954, "Production Raised 10% in Full Fashioned Seaming," James H. Blore, page 93. (Copy available Division 24 in 112–262A.)

UNITED STATES PATENT OFFICE

CERTIFICATE OF CORRECTION

Patent No. 2,898,023                                          August 4, 1959

Garland E. Bennett et al

It is hereby certified that error appears in the printed specification of the above numbered patent requiring correction and that the said Letters Patent should read as corrected below.

Column 4, line 15, for "of said in-" read -- on said in- --; line 34, strike out "drawn".

Signed and sealed this 22nd day of December 1959.

(SEAL)
Attest:

KARL H. AXLINE                                                 ROBERT C. WATSON
Attesting Officer                                            Commissioner of Patents